Oct. 25, 1960    W. A. CAVAGNARO ET AL    2,958,016
IMPULSE GENERATING DEVICE FOR A WATTHOUR METER
Filed Aug. 25, 1958    4 Sheets-Sheet 1

INVENTORS
William A. Cavagnaro
Edwin B. Judd
Walter J. Krzystyniak
Francis W. Truesdell
by Robert L. Peck
Their Attorney Oct. 25, 1960  W. A. CAVAGNARO ET AL  2,958,016
IMPULSE GENERATING DEVICE FOR A WATTHOUR METER
Filed Aug. 25, 1958  4 Sheets-Sheet 2
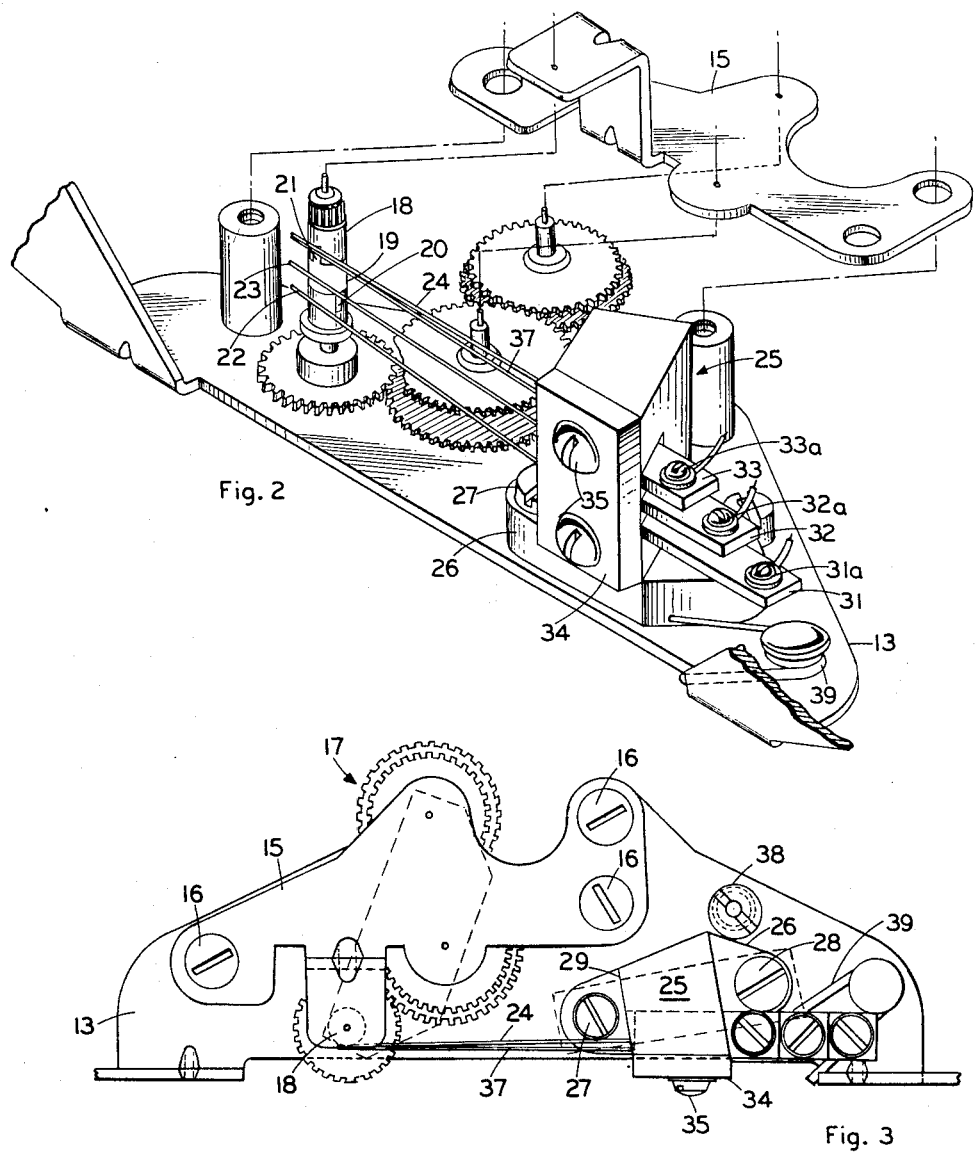
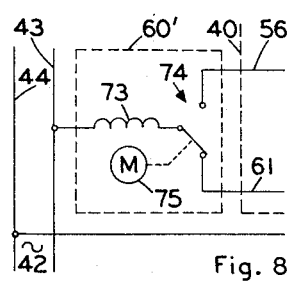
INVENTORS
William A. Cavagnaro
Edwin B. Judd
Walter J. Krzystyniak
Francis W. Truesdell
by Robert J. Peek
Their Attorney Oct. 25, 1960    W. A. CAVAGNARO ET AL    2,958,016
IMPULSE GENERATING DEVICE FOR A WATTHOUR METER
Filed Aug. 25, 1958    4 Sheets-Sheet 3

INVENTORS
William A. Cavagnaro
Edwin B. Judd
Walter J. Krzystyniak
Francis W. Truesdell
by Robert J. Peck
Their Attorney Oct. 25, 1960   W. A. CAVAGNARO ET AL   2,958,016
INPULSE GENERATING DEVICE FOR A WATTHOUR METER
Filed Aug. 25, 1958                                       4 Sheets-Sheet 4

INVENTORS
William A. Cavagnaro
Edwin B. Judd
Walter J. Krzystyniak
Francis W. Truesdell
by *Robert J. Reek*
Their Attorney

United States Patent Office 2,958,016
Patented Oct. 25, 1960

2,958,016

IMPULSE GENERATING DEVICE FOR A WATT-HOUR METER

William A. Cavagnaro, Berwick, Maine, Edwin B. Judd, Schenectady, N.Y., and Walter J. Krzystyniak, Rochester, and Francis W. Truesdell, Dover, N.H., assignors to General Electric Company, a corporation of New York Filed Aug. 25, 1958, Ser. No. 756,990

7 Claims. (Cl. 317—139)

This invention relates generally to improvements in the art of demand metering and more particularly to an improved impulse generating device for an induction watthour meter.

The rapid growth of the use of electricity in the United States has increased the importance of billing information supplied by demand metering equipment. New demand metering equipment has been developed which will handle up to 1,000 impulses per demand interval (more than three times the number of impulses heretofore handled by such equipment), the higher number of impulses per demand interval being necessary to reduce the dollar value per impulse to a reasonable amount.

In the past, a contact device mounted on a watthour meter has been commonly used as an impulse generator. Such contact devices comprise the well known 5-point star cams and cooperating switch blades, with the meter disc shaft being coupled to the cams by gearing which can be varied to cover a large range of ratios of contacts per meter disc revolution. Since the watthour meter is essentially a low torque device, the torque required to drive a contact device must be held to a minimum for practical torque-error compensation. In a high impulse rate demand system (i.e., over one contact for two meter disc revolutions), the standard cam operated impulse generating devices are unsatisfactory due to the increased continuous torque load imposed on the watthour meter caused by the inherently high driving torque required to operate the cams directly. Additionally, such prior contact devices normally carried currents of sufficient magnitude to cause arcing at their contacts, which condition is undesirably magnified at the higher demand rates.

Therefore, it is a primary object of this invention to provide an improved impulse generating device for an induction watthour meter which can be used in high impulse rate demand systems.

It is another object of the invention to provide an improved impulse generating device that imposes a minimum torque load on the associated induction watthour meter which drives it.

It is still another object of the invention to provide a delicate yet sturdy impulse generating device that will transmit on the order of two hundred million impulses without failure.

Briefly, in one aspect thereof, the invention comprises a commutator type single-pole double-throw switch in combination with novel amplifier circuits which not only allow minimum currents to be handled by the commutator type switch but prevent any arcing at the switch upon opening of its contacts. The commutator type switch is a low-friction contact mechanism that is mounted on the watthour meter which drives it, and the amplifier circuits can be in a separate housing apart from the watthour meter. By using a commutator type switch, the torque required to make and break its contacts is reduced to a minimum and the special amplifying circuitry permits the use of such switch mechanisms.

The above objects as well as others together with the benefits and advantages of the invention will be apparent upon reference to the detailed description set forth below, particularly when taken in conjunction with the drawings annexed hereto in which:

Figure 2 is a partly exploded perspective view of the contact mechanism shown in Figure 1;

Figure 3 is a top view of the contact mechanism shown in Figure 2;

Figure 8 is a portion of a schematic diagram showing a slightly different load circuit for the arrangement shown in Figure 4.

Figure 1:
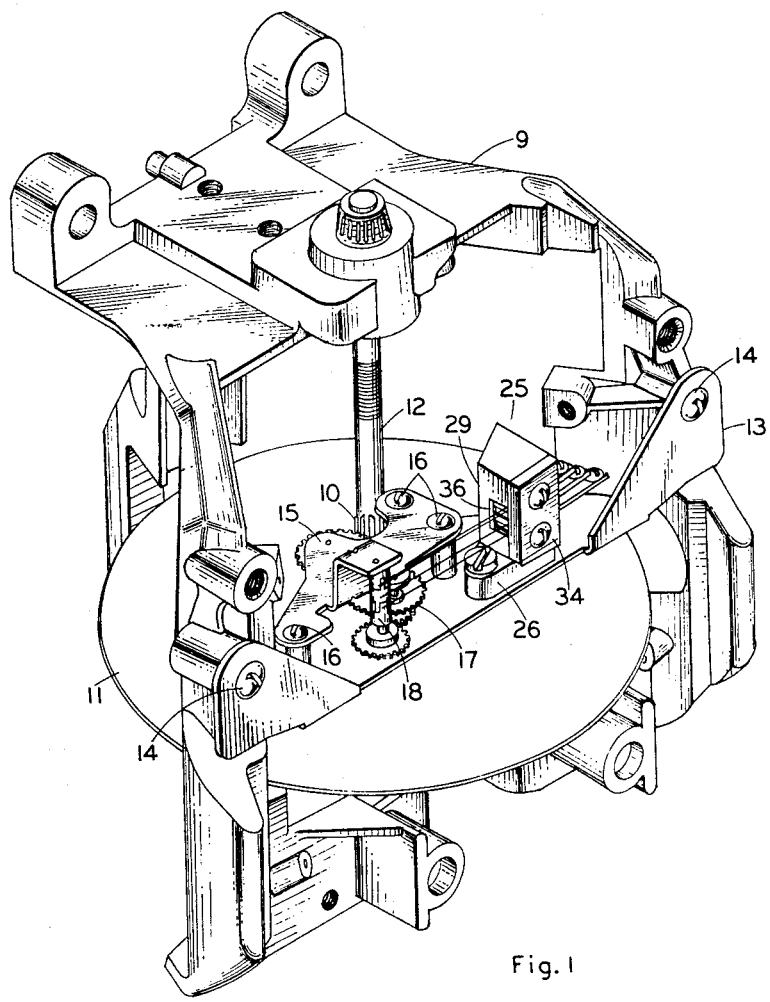
Figure 1 is a perspective view of the novel contact mechanism forming a part of this invention, together with part of the supporting structure of an associated induction watthour meter.

Referring first to Figure 1, there is shown a frame 9 which may be cast of a suitable material, such as aluminum alloy or the like, this frame comprising the main supporting structure of a two-element polyphase induction watthour meter of the type wherein the elements are arranged in a V-shaped manner. This type of polyphase induction watthour meter is well known in the art, and further description thereof is unnecessary in the interests of brevity. Suitably journaled for rotation relative to the frame is the induction disc armature 11 which is mounted on the shaft 12 which in turn is magnetically suspended in the frame 9 by a magnetic bearing suspension system of the type shown in U.S. Patent No. 2,311,382, Hansen.

The contact mechanism which is driven by the meter is carried by a support member 13 which is securely affixed to the frame 9 by means of the screws 14 or the like. A bearing plate 15 is mounted on support member 13 and spaced therefrom by a plurality of spacer elements 16, and this bearing plate cooperates with the support member 13 to provide the necessary journaling arrangements for a gear train 17 which has its input gear meshing with a fluted section 10 of the shaft 12 to be driven thereby. Long life is insured and friction is minimized in the gear train by the use of polished stainless steel pivots for the shafts on which the individual gears of the train are mounted.

The gear train 17 includes a rotatably mounted contact member 18 which rotates upon rotation of the disc member 11. As is seen in Figure 2, the contact member 18 is cylindrical in shape and includes a centrally disposed circumferentially extending band 19 or coating of electrically conducting material, such as silver or the like, which has extending therefrom on opposite sides thereof and disposed 90 degrees apart conducting segments, those on one side of the center strip being designated as segments 20 and those on the other side as segments 21. The balance of the member 18 may be made of a suitable insulating material such that the resulting structure is substantially in the form of a commutator which has a highly polished surface both in the conducting and nonconducting areas. Although the contact element is shown with four conducting segments 20 and 21, it is to be understood that a greater or lesser number could be used as desired in accordance with the requirements of any particular demand metering system.

Cooperating with the contact element 18 are the three spaced electrically conducting contact wires 22, 23, 24, which have portions near their outer extremities lightly resting on the contact member 18 and their inner extremities securely affixed in a pivotally mounted terminal block 25. The wires 22, 23, 24 may be a gold alloy material or the like and are extremely delicate, being on the order of .008 inch in diameter.

In the arrangement so far described, wire 23 continuously makes contact with center strip 19, with wire 22 periodically making contact with segments 20 and wire 24 periodically making contact with segments 21. The net effect of this construction is to short the wires 22 and 23 and 24 and 23 alternately and in sequence as the contact member 18 rotates to thus form a pair of switches which make and break contact in response to rotation of the induction meter disc.

Terminal block 25 may be molded from a suitable plastic material, and it comprises a base member 26 affixed to support member 13 by means of the screws 27, 28, and from the base extends a U-shaped yoke, best seen in Figure 1 at 29. Each of the wires 22, 23, 24 are supported by corresponding conducting strips 31, 32, 33, respectively, which lie within the yoke portion 29 and are spaced from one another and held in the yoke by means of the retaining cap 34 affixed to the yoke by means of screws 35. Cap 34 has a pair of inwardly projecting spaced separating elements which serve to space and insulate the strips 31, 32, 33 from each other. In order to affix the wires into their associated strips, small holes are drilled in the inner ends of the strips into which the wires may be placed and fixed thereto by a drop of solder or some other suitable material. Each of the strips 31, 32, 33 have the terminal screws 31a, 32a, 33a to which external leads may be attached. It is obvious from this construction that any suitable external lead can be affixed to the delicate contact wires without disturbing or affecting the condition of these wires.

If desired, a resilient strip 36 formed of a suitable insulating material can be placed along the base of the opening formed by the yoke portion 29 prior to insertion of the conducting strips 31, 32, 33, to compensate for any slight dimensional differences between the strips.

An extremely important requirement for the switch construction described so far is the adjustment and maintenance of the proper pressure of the contacting wires on the rotating commutator contact element 18. This pressure must be enough to insure good electrical contact, but it must not be too high lest it impose an undesirable load on the watthour meter. In switch structures, the pressure exerted by the contacts is often defined in terms of the "wipe" or "follow" of the spring biased members which form a part of the switch. In the present arrangement, the wires 22, 23, 24 are resilient members and are biased toward the contact member by proper positioning of the terminal block 25. The "follow" or "wipe," which is a function of the pressure exerted by the wires on the element 18, is the amount the wires would move after adjustment from their resting place on the member 18 were the member 18 removed from the assembly. It has been found in practice that .025 inch "follow" is adequate to insure proper electrical contact and yet not exceed the loading requirements of the contact mechanism. Such loading requirements may be a maximum available torque of .06 gram-millimeter to drive the contact mechanism.

In order to adjust the wires to achieve the .025 inch "follow," the support member 13 is provided with an arcuate slot which cooperates with the inner extremity of screw 28. Also, there is an auxiliary reference wire 37 which has been provided to permit the adjustment of "follow" in a very simple and expedient manner. The reference wire 37 is mounted in the end of strip 33 and is spaced from the contact wire 24 approximately .025 inch and extends parallel thereto. An eccentrically mounted screw 38 is carried by support member 13 and it engages a portion of base 26 of the terminal block. As is best seen in Figure 3, a hairpin spring 39 is also carried by support member 13 and biases the base of the terminal block against the eccentric screw 38. Now, when it is necessary to adjust the "follow" of the contact mechanism, the screws 27 and 28 are loosened and the eccentric screw 38 is rotated until the contact wires engage the contact element 18, and then it is further rotated until the reference wire 37 almost but not quite touches contact wire 24. This results in the proper "follow" in the contact mechanism, after which the screws 27, 28 can be tightened in place to hold the mechanism in its adjusted position. Normally this adjustment would be initially made in the factory during manufacture of the contact mechanism and if required can be made in the field simply by loosening the screws 27, 28 and manipulating eccentric screw 38 until the desired "follow" is achieved.

Figure 4:
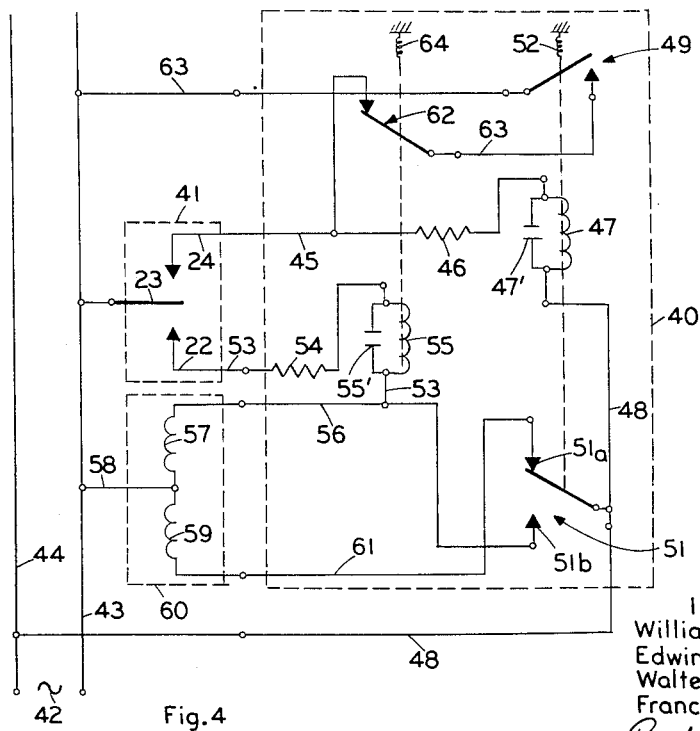
Figure 4 is a schematic wiring diagram of the contact mechanism of Figures 1 to 3 together with their associated novel amplifier circuits.

Referring now to Figure 4, the contact mechanism heretofore described is shown as block 41, with the wires 22, 24 being represented as stationary contacts and the wire 23 being represented as a movable contact. In the contact mechanism, all of the wires are stationary, but the representation in Figure 4 is the full equivalent, schematically, of the construction of the contact mechanism described above. A source of electrical energy is shown at 42, and it is seen that a side 43 of the source is connected to the wire 23 with the other side 44 of the source connected via the circuitry to be described below to the wires 22 and 24. This circuitry is included in the block 40, which may be designated as a relay amplifier.

Considering first the wire 24, it is connected to the other side of the source 42 by means of a first amplifying circuit which includes the lead 45, the current limiting resistor 46, the relay winding 47, and the lead 48. Associated with relay winding 47 is a conventional shunting capacitor 47' and a set of normally open contacts which form a holding switch 49 and the single-pole double-throw contact structure 51 which forms first and second load circuit control switches 51b and 51a respectively. The movable contacts of both the holding switch and the control switches are ganged together and move in unison, being held in the position shown in Figure 4 when the coil 47 is de-energized by the biasing spring 52. The winding 47 and its associated contacts have been designated as relay 68.

Connected to contact wire 22 by means of the lead 53 is a second amplifying circuit which includes a current limiting resistor 54, a relay winding 55, the lead 56, and the lower control switch 51b. Like winding 47, winding 55 is shunted by a capacitor 55'. Lead 56 also forms a part of a load circuit which includes the operating coil 57 of a demand meter 60 and the lead 58. The load circuit also includes another operating coil 59 of the demand meter 60, together with a lead 61 which brings the load circuit to the upper control switch 51a. The coils 57, 59 may form the operating elements of a printing demand meter of the type shown in U.S. Patent No. 1,742,072, wherein energization of the coils causes impulse counting to occur in the demand meter.

Under the control of relay winding 55 are a pair of normally closed contacts which form a disabling switch 62 connected in series with the holding switch 49 by means of the lead 63 and in shunt relation to the switch formed by the contact wires 23, 24. Again, as with the contacts of relay 68, the contact cooperating with relay winding 55 is biased in its closed position by means of the spring 64, the relay winding overcoming the force exerted by the spring when it is energized. Winding 55 and its associated contacts form relay 69.

Considering now the operation of the circuits described above, it is apparent that when wires 23, 24 are shorted by segments 21, the associated amplifying circuit is energized to pull down the contacts associated with relay windings 47, closing the holding switch 49 and closing the lower control switch 51b. This action has two effects: first, a separate path for energizing relay winding 47 is established through holding switch 49 and disabling switch 62, thus by-passing the contact mechanism 41 and relieving it of any electrical burden. That is to say, with the relay winding 47 energized, when the conducting segment 21 moves away from the wires 23, 24 to open the switch formed thereby, there is no interruption of current in the relay circuit and thus no arcing at the contacts. This feature of the circuit is extremely important in that it allows the use of the delicate contact wires which in turn enable the watthour meter to be unloaded and function with a minimum of friction when it is driving the contact mechanism. The second effect of energization of winding 47 is closure of the load circuit, which allows any desired current to flow to the printing demand meter coil 57 through the control switch 51b.

The impulse generator will remain in the condition described above after separation of the contact wires 23, 24 until the conducting segment 20 shorts the contact wires 23, 22. When this occurs the other amplifying circuit is energized, since the lower control switch 51b is also closed at this point to complete the circuit from the contact mechanism through the relay winding 55 and to the other side of the source 42. Upon energization of relay winding 55, the disabling switch 62 is opened, at which time the circuit energizing relay winding 47 is interrupted. When relay winding 47 is de-energized, holding switch 49 opens and control switch 51 flips, the lower control switch 51b opening and the upper control switch 51a closing. The actuation of switch 51 almost instantaneously follows energization of relay winding 55 so that the circuit through winding 55 is broken at the control switch 51 and not at the contact mechanism, for the shorting segment 20 is still across the wires 22, 24 at the time lower control switch 51b opens. In practice, the switches on the contact mechanism will remain closed for at least two milliseconds even at the maximum expected demand rate, and the relays will complete their operating cycles in much less than one millisecond—on the order of microseconds. Thus, the contact mechanism is again relieved of any arcing upon opening of its contacts.

Not only does the above action ready the circuit associated with winding 47 for the next shorting of contact wires 23, 24, but it also closes the circuit to demand meter coil 59 to allow another impulse to be counted.

The above action repeats itself indefinitely with the switch 51 moving between its upper and lower positions to energize the demand meter coils 57, 59 and count all of the impulses transmitted by the contact mechanism 41. Little current is drawn by the relay windings, being on the order of a maximum of 5 milliamperes; consequently, the wires 22, 23, 24 and contact element 18 carry a minimum of current when closing the amplifier circuits.

Since the relay amplifier circuits also eliminate any arcing at the contact mechanism, extensive tests have shown that two hundred million impulses can be transmitted by the contact mechanism without failure.

The relays themselves are designed to carry an arc-suppressed one-half ampere inductive load on their contacts, and with such a load, the relay contacts will function properly for fifty million operations of the relay. The relays will thus handle one hundred million impulses, or half the number of impulses that can be handled by the contact mechanism, and in order to double the life of the relays and make their lives substantially coextensive with the expected life of the contact mechanism, a novel arrangement of relays has been devised which upon reference to Figure 5 will be readily apparent.

Figure 5:
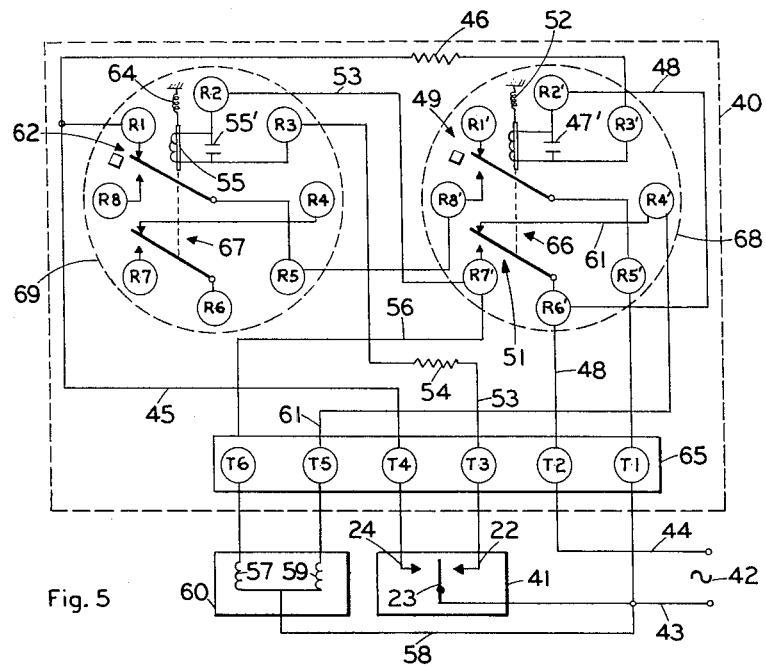
Figure 5 is a connection diagram of the wiring arrangement shown in Figure 4.

Thus, and looking at Figure 5, the relay amplifier 40 is seen to include a terminal board 65 having terminals T1, T2, T3, T4, T5, and T6, and each relay is in the form of a plug-in device having eight terminals designated, respectively, R1, R2, R3, R4, R5, R6, R7, R8, and R1', R2', R3', R4', R5', R6', R7', R8'. Each relay includes a pair of single-pole double-throw contact mechanisms 66, 67, respectively, giving a total of four contacts in each relay, with only certain of the contacts in each being connected in the amplifier circuits at a time. For example, and considering relay 68, which is the one having the relay winding 47, it is seen that the contacts which form holding switch 49 form one-half of a single-pole, double-throw switch whose relay terminals are R1', R5', and R8'. The contact connected to R8' is the one that is used, with the contact connected to R1' being unused. The load circuit control switch 51 has its contacts connected to relay terminals R4', R6' and R7', and these contacts form a part of the amplifier circuit and are consequently in use. Looking now at relay 69, which is the one that includes relay winding 55, it is seen that the contact connected to R8 is unused as well as the contacts connected to R4, R6, and R7; that is, the contact connected to R1 is the only one that is active in this relay, being part of the disabling switch 62.

With this arrangement in mind, it is seen that the two relays can operate for the expected fifty million operations without failure, after which they can be interchanged. The previously unused contacts will now be connected into the circuit and will function properly for the additional fifty million operations. The relays are mounted on standard tube plugs which, in turn, cooperate with standard tube sockets, and as is well known in such devices, the socket and plug are arranged to permit only one particular orientation of the plug in the socket, thereby simplifying the interchange and making it foolproof.

Figure 6:
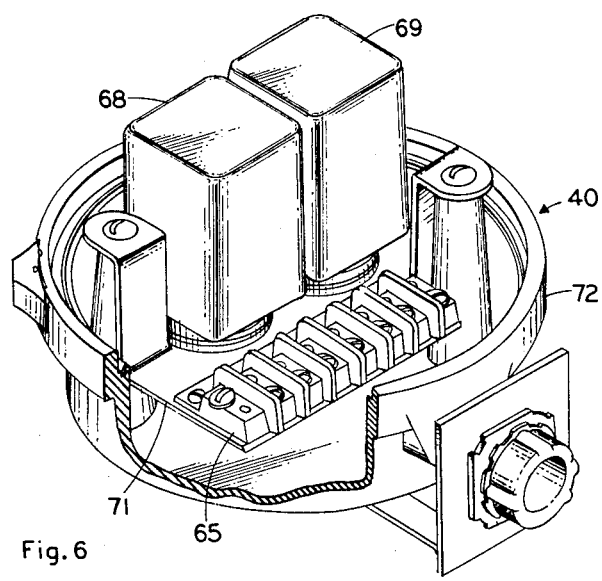
Figure 6 is a partially cut-away perspective view of the housing and associated structure which forms the amplifying circuitry of Figures 4 and 5.
Figure 7:
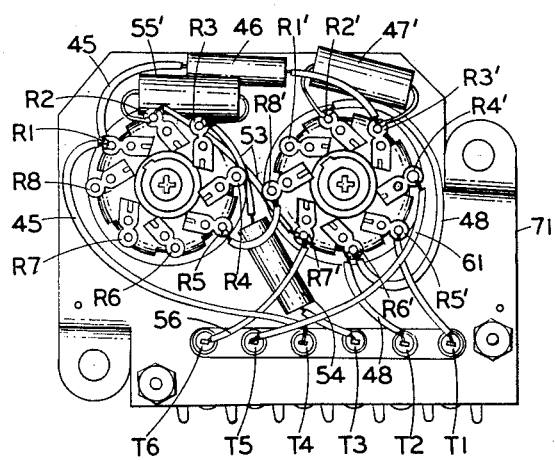
Figure 7 is a bottom view of the arrangement shown in Figure 6 with the housing removed.

In Figure 6, the relay amplifier is shown within its housing with the relays plugged in their sockets. A support plate 71 is suitably secured within the housing 72, and this plate carries the sockets for the relays and the terminal board 65. Figure 7 is a view of the underside of plate 71 showing the manner in which the relay sockets and terminal board are internally wired.

In connecting the contact mechanism and the relay amplifier into a demand metering system, it is apparent that the source may be connected across the terminals T1, T2 and the lead from contact wire 23 as well as leads 58 and 63 can also be connected to terminal T1, with lead 48 connected to terminal T2. Connections from the contact mechanism via contacts 22, 24 will be to terminals T3 and T4 and connections from the coils of the printing demand meter will be made to terminals T5 and T6. The remaining connections for the relay amplifier circuits are all made within the amplifier itself.

Thus, it is seen that connection of the impulse generator in a demand metering system is quite simple and requires a minimum of external lead wires.

Referring now to Figure 8, there is shown a different form of demand meter in place of the two-coil arrangement of Figure 4. Except for this change, the circuitry is in all other respects identical and has been omitted from Figure 8 as unnecessary. The modification of Figure 8 shows a demand meter that uses an impulse motor for counting, with the energizing coil of the motor being shown at 73. The leads 56 and 61 are connected to a standard three-blade cam operated contact mechanism 74 which has its cam connected to the rotor 75 of the impulse motor. The contact mechanism functions in the known manner to receive the pulse coming from either side of the control switch 51 after which the circuit is broken through the incoming line and then closed on the other side to be ready for the next impulse. In this way, the contact mechanism 74 de-energizes the impulse motor after each impulse is transmitted by the relay amplifier. For a further description of a demand meter using an impulse motor, reference is made to the copending application of Paul V. Terry, entitled "Printing Demand Meter," Serial No. 688,257, filed October 4, 1957, and assigned to the same assignee of the present invention.

Thus, it is seen that the impulse generating device can function with both solenoid operated and motor operated demand meters. Also, although shown mounted on a V-type two element polyphase watthour meter, the impulse generating device may be used with other forms of polyphase watthour meters, as well as with single-phase watthour meters.

In summary, the impulse generator will be ideal for any demand metering applications requiring long life, high accuracy, and maintenance-free service. Even at a rate of 2,000 demand impulses per hour, the expected trouble-free life of the device is about ten years. For normal service under today's demand metering conditions, an expected trouble-free life of twenty-five or more years will be obtained.

Therefore, while particular embodiments of the subject invention have been shown and described herein, these are in the nature of description rather than limitation, and it will occur to those skilled in the art that various changes, modifications, and combinations may be made within the province of the appended claims and without departing either in spirit or scope from this invention in its broader aspects.

What we claim as new and desire to secure by Letters Patent of the United States is:

1. An impulse generating device for an induction watthour meter comprising, in combination: a commutator type single-pole double-throw contact mechanism; said mechanism including a rotatably mounted contact member adapted to be driven by said watthour meter and a plurality of spaced contact wires which have portions thereof lightly engaging said contact member; said wires forming together with said contact member first and second normally open switches; said contact member and said wires being so constructed and arranged that said first and second switches are sequentially and alternately closed and opened as said contact member rotates; a first amplifier circuit connectable in series with said first switch across a source of electrical energy; said first amplifier circuit being energized when said first switch closes; a holding circuit connectable across said first switch; a second amplifier circuit including a series connected third switch connectable in series with said second switch across said source; said second amplifier circuit being energized when said second and third switches close; a load circuit connectable across said source; first means responsive to energization of said first amplifier circuit for connecting said holding circuit across said first switch, for connecting said load circuit across said source, and for closing said third switch; and second means responsive to energization of said second amplifier circuit for disconnecting said holding circuit whereby said first amplifier circuit is deenergized; said first means being responsive to said de-energization to connect said load circuit across said source and to open said third switch and de-energize said second amplifier circuit.

2. An impulse generating device for an induction watthour meter comprising, in combination: a commutator type single-pole double-throw contact mechanism; said mechanism including a rotatably mounted contact member adapted to be driven by said watthour meter and a plurality of spaced contact wires which have portions thereof lightly engaging said contact member; said wires forming together with said contact member first and second normally open switches; said contact member and said wires being so constructed and arranged that said first and second switches are sequentially and alternately closed and opened as said contact member rotates; a first amplifier circuit connectable in series with said first switch across a source of electrical energy; a normally open holding switch and a normally closed disabling switch connectable in series across said first switch; a second amplifier circuit connectable in series with said second switch across said source; first and second control switches; and a load circuit connectable through either of said control switches across said load; said second amplifier circuit also including said first control switch connected in series therewith; said first amplifier circuit being energized when said first switch closes; said second amplifier circuit being energized when said second switch closes and said first control switch is closed; first means in said first amplifier circuit responsive to energization thereof for closing said first control switch and said holding switch; and second means in said second amplifier circuit responsive to energization thereof to open said disabling switch; said first amplifier circuit being de-energized upon opening of said disabling switch; said first means responding to said de-energization to open said holding switch, to open said first control switch and to close said second control switch.

3. The combination defined by claim 2 wherein said contact wires are mounted together in a pivotally mounted terminal block, said block being movable to adjust the pressure exerted by said wires on said contact member.

4. The combination defined by claim 3 wherein a reference wire is mounted in said block, said reference wire extending parallel to one of said contact wires and spaced therefrom on the side of the contact wire opposite to the side which engages said contact member.

5. An impulse generating device for an induction watthour meter comprising, in combination: a commutator type single-pole double-throw switch; said switch including a rotatably mounted contact member adapted to be driven by said watthour meter and three spaced contact wires which have portions thereof lightly resting on said contact member; said three wires forming together first and second pairs of normally open switching contacts with one of the wires being common to both pairs and connected to one side of a source of electrical energy; the other wires being respectively connected to the other side of said source through first and second relay circuits; said contact member being so constructed and arranged that it alternately and sequentially closes and opens said pairs of contacts as it rotates; said first relay circuit including a first relay winding, a pair of normally open holding contacts, and a pair of normally closed disabling contacts; said first winding being connected in series with said first pair of switching contacts across said source; said holding contacts and said disabling contacts being connected in series and in shunt relation to said first pair of switching contacts; said second relay circuit including a second relay winding; first and second pairs of control contacts; said second winding being connected in series with said second pair of switching contacts and with said first pair of control contacts across said source; said pairs of control contacts also being alternately connectable to a load circuit; said first relay winding becoming energized when said first pair of switching contacts close; said holding contacts and said first control contacts closing upon energization of first relay winding; said second relay winding becoming energized when said second pair of switching contacts close; said disabling contacts opening upon energization of said second relay winding to de-energize said first relay winding; said holding contacts opening, said first control contacts opening, and said second control contacts closing upon de-energization of said first relay winding.

6. An impulse generating device for an induction watthour meter comprising, in combination: a commutator type single-pole double-throw switch; said switch including a rotatably mounted contact member adapted to be driven by said watthour meter and three spaced contact wires which have portions thereof lightly resting on said contact member; said three wires forming together first and second pairs of normally open switching contacts with one of the wires being common to both pairs and connected to one side of a source of electrical energy; the other wires being respectively connected to the other side of said source through first and second relay circuits; said contact member being so constructed and arranged that it alternately and sequentially closes and opens said pairs of contacts as it rotates; said first relay circuit including a first relay which is energized when said first pair of switching contacts close and means in parallel with said first pair of switching contacts for maintaining said first relay energized after said first pair of switching contacts open; a load circuit including means connecting it across a source of electrical energy in response to energization and de-energization of the first relay; said second relay circuit including a second relay which is energized when said second pair of switching contacts close; and means responsive to energization of said second relay for de-energizing said first relay.

7. An impulse generating device for an induction watthour meter comprising, in combination: a commutator type single-pole double-throw switch; said switch including a rotatably mounted contact member adapted to be driven by said watthour meter and three spaced contact wires which have portions thereof lightly resting on said contact member; said three wires forming together first and second pairs of normally open switching contacts with one of the wires being common to both pairs and connected to one side of a source of electrical energy; the other wires being respectively connected to the other side of said source through first and second relay circuits; said contact member being so constructed and arranged that it alternately and sequentially closes and opens said pairs of contacts as it rotates; said first and second relay circuits including first and second relay windings, respectively, which are energized when their corresponding switching contacts close; a load circuit including means connecting it across a source of electrical energy in response to energization and de-energization of the first relay windings; and first and second de-energizing circuits for said first and second relay windings, respectively; said de-energizing circuit for said first relay winding including circuit opening means in parallel with said first relay winding switching contacts, said circuit opening means opening in response to energization of said second relay winding to de-energize said first relay winding apart from said first relay winding switching contacts.

References Cited in the file of this patent

UNITED STATES PATENTS

| | | |
|---|---|---|
| 129,085 | Barjon | July 16, 1872 |
| 1,751,263 | Cesareo | Mar. 18, 1930 |
| 2,659,838 | Rocher | Nov. 17, 1953 |
| 2,662,954 | Snow | Dec. 15, 1953 |
| 2,763,820 | Fiedler | Sept. 18, 1956 |